Feb. 12, 1946. H. H. WHEELER 2,394,575
TRANSPOSITION BRACKET
Filed Sept. 5, 1942 2 Sheets-Sheet 1
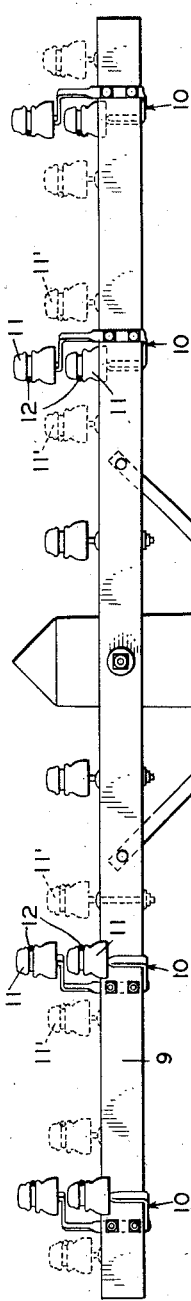
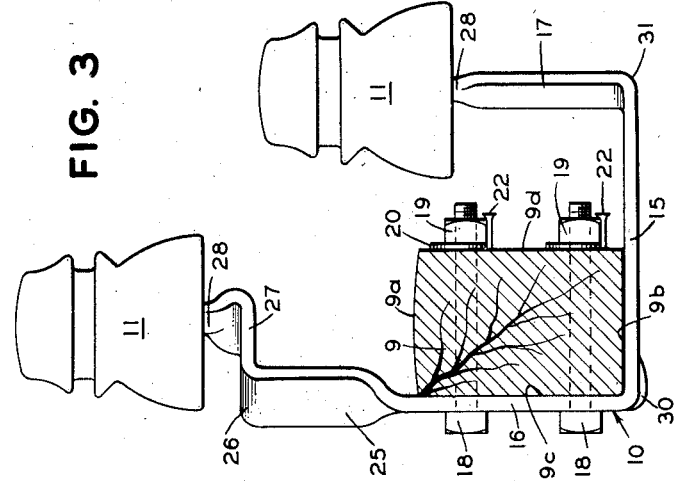
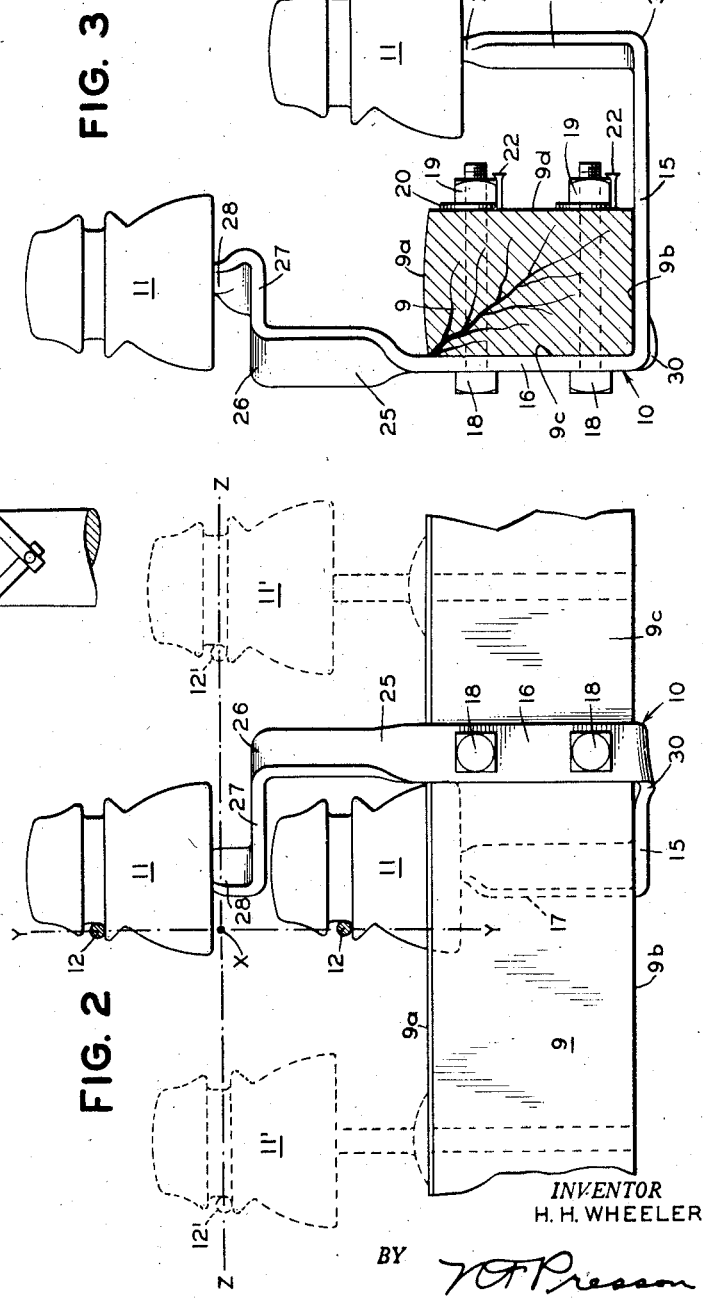
INVENTOR
H. H. WHEELER
BY
ATTORNEY.

Patented Feb. 12, 1946

2,394,575

UNITED STATES PATENT OFFICE 2,394,575

TRANSPOSITION BRACKET

Herbert H. Wheeler, Millburn, N. J., assignor to The Western Union Telegraph Company, New York, N. Y., a corporation of New York Application September 5, 1942, Serial No. 457,500

5 Claims. (Cl. 174—33)

This invention relates to transposition brackets for use in connection with open wire telephone and telegraph circuits, and more particularly to an improved transposition bracket which enables more accurate and symmetrical transpositions to be obtained and which is especially adapted for transposing circuits carrying frequencies ranging in the carrier spectrum.

In the construction of transmission lines, such as telephone and telegraph lines, the pairs of conductors comprising each circuit are necessarily transposed at certain spaced intervals to balance out and neutralize inductive interference from adjacent communication circuits and also from proximate power lines and other sources of disturbing currents, the positions of the conductors of each pair or circuit with respect to the conductors of adjacent circuits being changed at predetermined intervals. As is well known, these conductors are carried on insulators mounted on pins supported at definite intervals from each other on horizontal crossarms carried by poles, the conductors of each pair being transposed at certain poles to form a definite transposition system which is made up of sections, each transposition section being complete in itself and the circuit balanced within each section.

In general, either of two types of transpositions are employed in practice, (1) a rolling or running transposition in which the conductors of each pair or circuit are rotated 180° within a length of two adjoining spans of the conductors, by means of two vertically disposed insulators mounted on a transposition pole at the midpoint of the transposition, and (2) point transpositions in which the conductors of the pair are maintained substantially in their usual horizontal positions on each side of the transposition pole, and four insulators are employed at the transposition pole so that one of the conductors of a pair may be crossed over the other conductor of the pair at this point.

In point transpositions, undesirable pin leakage is introduced into the circuit by reason of the fact that this arrangement requires four insulators to transpose a pair at each transposition pole; the stringing of wire is more difficult because the wire cannot easily be pulled around the abrupt angles formed by the arrangement of the insulators and their supporting pins; and if point transpositions are inserted in existing lines, this requires the splicing of additional wire into the conductors and necessitates additional splices in the circuit which tend to increase the resistance of the circuit. Also, the point transposition brackets are relatively heavy and expensive, and the likelihood of the conductors of a circuit becoming short-circuited is increased since these conductors cannot be supported at the precise point of crossover, and snow, sleet, birds' nests, and other foreign material are more likely to lodge or be formed between the wires due to their relatively close spacing at the crossover points.

With regard to rolling or running transpositions, it has been the general practice to support one of the conductors of a pair on the usual crossarm pin and insulator and to support the other conductor at the transposition pole on an insulator secured to a depending bracket mounted on the crossarm, so that one of the conductors is above the crossarm and the other conductor below the crossarm. This method of transposing is disadvantageous since it is desirable to have both conductors above the crossarm at all times so that in the event a tie wire should become loose, or the insulator come off the pin, the conductor will be supported by the crossarm above which it passes, instead of hanging below the arm where it is more likely to become broken or swing into other circuits, and the long unsupported loop in such a case tends to introduce undesired slack into the conductor. Moreover, in such an arrangement, the conductors of the circuit are not symmetrically disposed on the transposition poles with respect to the axis of the circuit, and this very substantially decreases the efficiency of the transposition system. This is because rotation of the transposition about the axis of a pair of conductors causes the coupling and correspondingly the cross talk to be symmetrical with respect to the two adjoining spans included in the transposition, but if the center of rotation of the transposition is displaced materially with respect to the axis of the pair the induced cross talk is unsymmetrical with respect to the spans adjoining the transposition. Where the cross talk is symmetrical it is neutralized, but where it is unsymmetrical it is not neutralized and causes disturbing effects in the circuits.

An object of the invention is a transposition bracket which provides for rolling or running transpositions of the conductors of a circuit, and which causes the conductors to be supported on the transposition poles substantially symmetrically with respect to the axis of the circuit.

Another object is a transposition bracket adapted to support insulators in such position that the conductors of the pair will be centered in a horizontal direction with respect to the axis of the circuit and substantially centered in a vertical direction with respect to the axis of the circuit.

A further object is a transposition bracket having the foregoing advantages, and which may be made in one piece so that it comprises an integral structure, and which prevents displacement of the insulators both with respect to each other and to adjacent circuits.

An additional object is a transposition bracket of the character disclosed which may be secured snugly against the side of the crossarm, and in which the bracket is more firmly braced against the longitudinal stresses imposed by the conductors of the circuit.

A still further object is a transposition bracket of the character disclosed which is adapted for quantity production methods, and which is light in weight and may be produced at a low cost, and which is sufficiently rugged to withstand severe strains encountered in service.

A still further object is a transposition bracket which insures more efficient transpositions and a more symmetrical disposition of the conductors at the transposition points, and which is adapted to operate efficiently with circuits carrying high frequencies lying in the carrier spectrum.

The foregoing and other objects and advantages of the invention will be apparent from the following detailed description, taken in connection with the accompanying drawings, in which:

Fig. 1 is a view of several transposition brackets constructed in accordance with the invention, as applied to the crossarm of a transposition pole;

Fig. 2 is a view, in elevation, of one of the transposition brackets, looking towards a side of the crossarm on which it is mounted, and showing the symmetrical arrangement of the conductors at the transposition pole with respect to the axis of the circuit;

Fig. 3 is a view of the bracket of Fig. 2, looking towards the right hand end of the crossarm as seen in Fig. 2;

Figure 5:
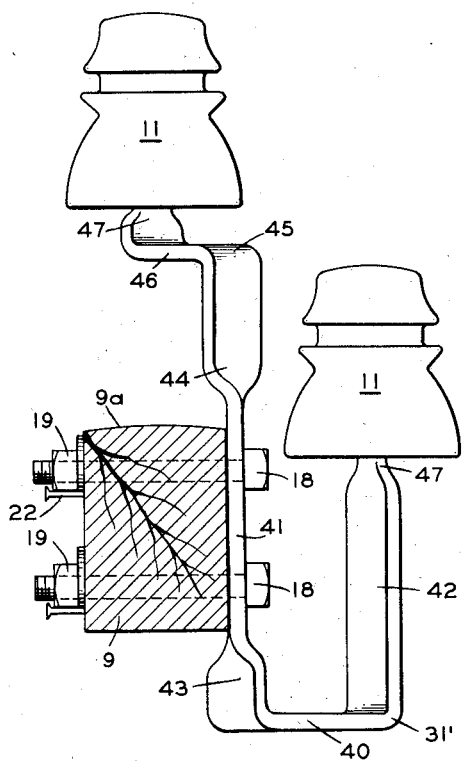
Fig. 5 is a view, similar to Fig. 3, showing a modified form of transposition bracket in accordance with the invention.

Referring now to Fig. 1 of the drawings, there is shown a standard ten pin crossarm 9 on a transposition pole, in which the conductors comprising four of the circuits of the pole line are transposed by means of transposition brackets 10 constructed in accordance with the invention. The insulators 11, carried by the brackets 10, are disposed vertically so that the pair of conductors 12 of each circuit are vertically disposed at the midpoint of the transposition. The conductors 12 are, in accordance with the well known practice, carried in wire grooves in the conductors, and for clarity the tie wires which secure the conductors to the insulators are omitted. On each side of the transposition brackets are shown in dotted outline insulators 11' which indicate the positions of the insulators and the conductors carried thereby on poles where no transpositions are employed, including the poles adjacent to the transposition pole shown.

Figs. 2 and 3 show various details of a preferred embodiment of the invention. Preferably, although not necessarily, the transposition bracket is made of flat stock, and is generally U-shaped in configuration, the material preferably comprising a mild steel. The bracket comprises a central body or base portion 15, having two upstanding leg portions 16 and 17 integral therewith, and projecting vertically substantially at right angles to the body portion 15. The bracket may be clamped to the crossarm by means of machine bolts 18 which pass through holes in the leg 16 and corresponding holes bored in the crossarm. Washers 20 are placed on the threaded ends of the bolts and nuts 19 screwed up tightly against the washers. The washers may have a flat edge portion on one side thereof so that a pin or nail 22 may be driven into the arm and bear against the flat side of the washer and nut 19 to prevent the nut from unscrewing.

It will be seen that the leg 16 has a relatively large flat surface which bears against the flat side 9c of the crossarm 9, this being seen better in Fig. 3, and also that the base or central body portion 15 has a relatively large flat surface which bears against the flat underside 9b of the crossarm. By reason of this a firm snug bearing for the bracket is insured, as distinguished from brackets of the types which heretofore have been secured to the curved top surface 9a of the crossarm.

Referring particularly to Fig. 2, it will be noted that the base 15 is disposed obliquely, in a horizontal plane, with respect to the leg 16; this causes the longer leg 16 to have a portion thereof displaced laterally (to the right as viewed in the figure) with respect to the shorter leg 17 so that there is ample clearance between the leg 16 and the conductor 12 on the lower insulator 11 supported on the leg 17. In order to bring the upper insulator 11 back into vertical alignment with the lower insulator, so that the two conductors 12 of the circuit will lie in a vertical plane that coincides with the axis of the circuit, the leg 16 is twisted at 25, and is bent at the point 26 to form a right angle portion 27, the right angle portion in turn being bent upwardly to form an insulator supporting portion 28. In order to cause the base portion 15 to have the greatest possible bearing surface with the underside 9b of the crossarm, the strap iron is bent at right angles and heated at the point 30, the portion 15 being given an oblique bend in the plane of its face, which results in a slight extrusion of metal at the point 30, whereby a greater portion of the base 15 will lie flat against the bottom portion of the crossarm.

It will be noted from Fig. 2 that both conductors 12 of the pair lie in a vertical plane $y$—$y$ which passes through and coincides with the axis $x$ of the circuit, the axis of the circuit being an imaginary line parallel to the circuit and lying midway between the two conductors and in a horizontal plane $z$—$z$ that passes through the conductors when in their normal positions as indicated at 12'. It will also be noted that the pair of conductors 12, 12 are substantially equally spaced above and below the plane $z$—$z$, so that the axis of rotation of the transposition for all practical purposes coincides with the axis $x$ of the pair. This is not exactly symmetrical along the line $y$—$y$, since it is not desirable to lower the insulator 11 below the position shown, in order to maintain a desired spacing between the lower line conductor 12 and the top of the crossarm 9, but the difference is so slight in this direction as not to appreciably affect the efficiency of the transposition. If desired, however, the height of the lower insulator 11 could be reduced slightly so that the vertical spacing between the two conductors and the plane $z$—$z$ will be exactly equal, although in practice this has not been found essential.

Figure 4:
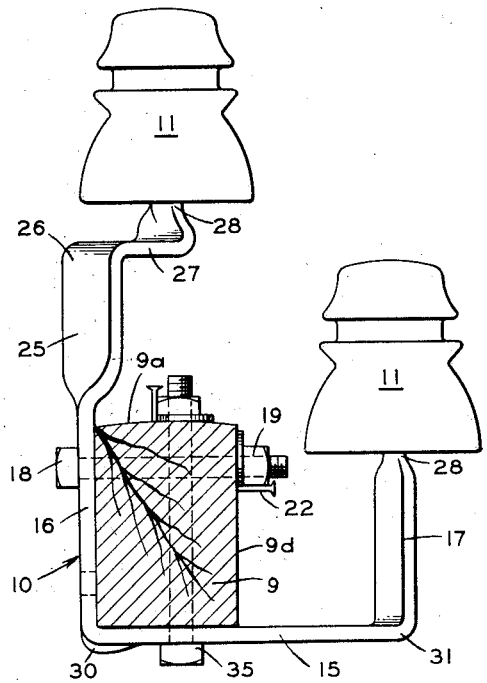
Fig. 4 is a view, similar to Fig. 3, showing a means of securing the transposition bracket when positioned at large corners in the pole line.

Fig. 4 illustrates a preferred method of securing the bracket to the crossarm at corner poles at large corners, and in this case one machine bolt 18 is employed, as in the preceding figures, and a second machine bolt 35 is passed through an aperture in the base 15 and through the crossarm in the manner shown, thereby effectively preventing any displacement of the bracket even with a large side pull on the insulators due to the changed direction of the circuit.

Fig. 5 illustrates a modification of the invention in which the bracket does not lie against the bottom of the crossarm, but instead is secured to one side only of the arm. This type of bracket comprises a relatively short base 40, with upstanding legs 41 and 42. In this form the base 40 is disposed obliquely in a horizontal direction with respect to the leg 41 by means of the twist 43 which is sufficient to displace the legs 41 and 42 relative to each other thereby to provide the desired clearance between the conductor on the lower insulator and the adjacent portion of the leg 41. The leg 41 is twisted at 44 to properly position the upper insulator and bring it into alignment in a vertical plane with respect to the lower insulator. The upper portion of the leg 41 is bent at right angles at the point 45 to provide a horizontal section 46 which is bent upwardly to provide an insulator supporting pin portion 47. The symmetrical positions of the insulator and the conductors carried thereby, relative to the axis of the circuit, are the same as in the first embodiment described.

In each of the embodiments shown it will be understood that the portions directly supporting the insulators may be rounded to form integral insulator pins on which the insulators may either be directly mounted, or on which wooden, steel or lead cobs may be screwed or otherwise secured on the insulator pin portions, and the insulators screwed on the cob, in a manner well known in the art. Also, instead of having the insulator pin portions formed integral with the bracket, it is to be understood that portions of the bracket, such as 27 and 46, may be drilled or otherwise formed to receive separable insulator pins, if desired.

Preferably, and as disclosed, the bracket is made of strap iron and thus may be made of standard stock which is readily obtainable, the standard stock also providing flat bearing surfaces which snugly fit against the crossarm to more firmly anchor the same in place. It will be appreciated, however, that the bracket may also be made of stock which is square, round, or other cross section or configuration, although in any case it is desirable for at least one of the legs to have a flat surface portion in order to fit snugly against a side of the crossarm, and preferably, although not necessarily, having the face or bottom portion of the bracket with a flat surface bearing against the underside or bottom of the crossarm.

The foregoing embodiments of the invention are illustrative only, and various other modifications will readily suggest themselves to those versed in the art without departing from the spirit and scope of the invention as defined in the appended claims.

What I claim is:

1. A line wire transposition bracket adapted to be mounted on the crossarm of a transposition pole, comprising a central base portion and two leg portions projecting upwardly from the base portion when the bracket is in position on the crossarm, said leg portions having the upper ends thereof projecting above the crossarm, one of said legs being longer than the other leg to support the insulators and the line wires carried in the wire grooves thereof at different heights respectively above the crossarm, the longer of said legs having a flat bearing surface of substantial extent for securing the bracket snugly against one of the vertical flat sides of the crossarm, said longer leg being substantially parallel to the shorter leg, but having a portion thereof displaced laterally relative to the shorter leg to provide suitable clearance between the longer leg and the conductor supported by the insulator on the shorter leg, both of said leg portions having the upper ends thereof formed to support the said insulators in such positions that their wire grooves are substantially in a vertical plane passing through and coinciding with the axis of the circuit.

2. A one-piece line wire transposition bracket adapted to be mounted on the crossarm of a transposition pole, comprising a central base portion and two leg portions integral therewith and projecting upwardly from the base portion when the bracket is in position on the crossarm, said leg portions having the upper ends thereof projecting above the crossarm, one of said legs being longer than the other leg to support the insulators and the line wires carried in the wire grooves thereof at different heights respectively above the crossarm, the longer of said legs having a flat bearing surface of substantial extent for securing the bracket snugly against one of the vertical flat sides of the crossarm, said longer leg being substantially parallel to the shorter leg, but having a portion thereof displaced laterally relative to the shorter leg to provide suitable clearance between the longer leg and the conductor supported by the insulator on the shorter leg, both of said leg portions having the upper ends thereof formed to support the said insulators in such positions that their wire grooves are substantially in a vertical plane passing through and coinciding with the axis of the circuit.

3. A line wire transposition bracket adapted to be mounted on the crossarm of a transposition pole, comprising a central base portion and two leg portions projecting upwardly from the base portion when the bracket is in position on the crossarm, said leg portions having the upper ends thereof projecting above the crossarm, one of said legs being longer than the other leg to support the insulators and the line wires carried in the wire grooves thereof at different heights respectively above the crossarm, the longer of said legs having a flat bearing surface of substantial extent for securing the bracket snugly against a flat side of the crossarm, said base portion also having a flat bearing surface of substantial extent for securing said base snugly against the flat bottom of the crossarm, said longer leg being substantially parallel to the shorter leg, but having a portion thereof displaced laterally relative to the shorter leg to provide suitable clearance between the longer leg and the conductor supported by the insulator on the shorter leg, both of said leg portions having the upper ends thereof formed to support the said insulators in such positions that their wire grooves are substantially in a vertical plane passing through and coinciding with the axis of the circuit.

4. A line wire transposition bracket adapted to be mounted on the crossarm of a transposition pole, comprising a central base portion and two leg portions integral therewith and projecting upwardly from the base portion when the bracket is in position on the crossarm, said leg portions having the upper ends thereof projecting above the crossarm, one of said legs being longer than the other leg to support the insulators and the line wires carried in the wire grooves thereof at different heights respectively above the crossarm, the longer of said legs having a flat bearing surface of substantial extent for securing the bracket snugly against a flat side of the crossarm, said longer leg being substantially parallel to the shorter leg, but having a portion thereof displaced laterally relative to the shorter leg to provide suitable clearance between the longer leg and the conductor supported by the insulator on the shorter leg, both of said leg portions having the upper ends thereof so formed and disposed laterally as to support the insulators in such positions that the line wires carried thereby are positioned substantially in a vertical plane passing through and coinciding with the axis of the circuit and are positioned vertically so that the said line wires respectively are spaced substantially equally above and below said axis of the circuit.

5. A line wire transposition bracket composed of flat metal stock and adapted to be mounted on the crossarm of a transposition pole, comprising a central base portion and two leg portions integral therewith and bent so as to project upwardly from the base portion when the bracket is in position on the crossarm, said leg portions having the upper ends thereof projecting above the crossarm, one of said legs being longer than the other leg to support the insulators and the line wires carried thereby at different heights respectively above the crossarm, the longer of said legs having a flat side surface for securing the bracket snugly against a flat side of the crossarm, said longer leg being substantially parallel to the shorter leg, said base having a portion thereof disposed obliquely relative to the longer leg to displace the leg laterally to provide suitable clearance between the longer leg and the conductor supported by the insulator on the shorter leg, the longer of said legs having the upper end thereof bent at an angle to support its insulator in such position that the line wires carried by the two insulators are positioned substantially in a vertical plane passing through and coinciding with the axis of the circuit and positioned vertically so that the said line wires respectively are spaced substantially equally above and below said axis of the circuit.

HERBERT H. WHEELER.